United States Patent [19]
Lin

[11] Patent Number: 6,050,685
[45] Date of Patent: Apr. 18, 2000

[54] EYEGLASSES WITHOUT A FRAME

[76] Inventor: Haan-Yeou Lin, P.O. Box 90, Tainan City, Taiwan

[21] Appl. No.: 09/368,143

[22] Filed: Aug. 5, 1999

[51] Int. Cl.$^7$ ...................................................... G02C 1/00
[52] U.S. Cl. ........................................... 351/110; 351/111
[58] Field of Search .................................... 351/110, 111, 351/113, 114, 41, 136, 124

[56] References Cited

U.S. PATENT DOCUMENTS

| | | | |
|---|---|---|---|
| 5,073,020 | 12/1991 | Lindberg et al. | 351/110 |
| 5,684,559 | 11/1997 | Lin | 351/110 |
| 5,781,270 | 7/1998 | Fortim | 351/110 |

*Primary Examiner*—Hung Xuan Dang

[57] ABSTRACT

Eyeglasses without a frame includes two lenses, a bridge, two connectors and two temples. The bridge and the connectors have position members and rest members to embrace the two lenses in a stabilized position, and locking members for screws to pass through. Each temple has a fit member in a front end and a bent member behind the fit member, which has four flat surfaces. Then one of the four flat surface contacts flatly with a rear end of each connector to secure each temple in a position, with the bent member forming an acute angle with the connector to separate the temple from the connector to prevent friction of the both, thus preventing the plated surfaces of the both from peeling off. Each bent member has proper elasticity to let the temple expand outward to be worn with comfort and without disfiguring and damage of the eyeglasses.

2 Claims, 6 Drawing Sheets

EYEGLASSES WITHOUT A FRAME

BACKGROUND OF THE INVENTION

This invention relates to eyeglasses without a frame, particularly to one possible to prevent a temple from expanding outward excessively to let a connector of the lens break or disfigure, permitting to be worn with comfort, easy to make and stabilized after assembled together.

Known conventional eyeglasses without a frame shown in FIG. 1 includes two lenses 10, a connector 11 connected to each lens 10, and two temples 12.

Each lens 10 has a hole 100 near an outer curved side edge, and each connector 11 has a little curved fix rod portion 111 with an upper end 112 provided with a round hole 113 at an inner end and another vertical end rod portion 117. Then a screw 114 passes through the hole 100, the hole 113 and a gasket 115 to engage with a nut 116 tightly to secure the connector 11 with the lens 10. So the lens 10 contacts the fix rod portion 111. Each temple 12 has a ring 120 formed in a front end and fitting around an upper end of the vertical rod portion 117 to secure the temple 12 with the connector 11.

However, the known conventional eyeglasses have a first disadvantage that combination of the lens 10 and the connector 11 is not solid enough, but loose, because the curvature of the outer edge of the lens does not completely fit with that of the fix rod portion 111, contacting with each other only with a point, in addition to liable break of the lens 10 for avoiding excessive tightness of the screw 114 and the nut 116. A A second advantage is that the lens 10 may easily break or the connector 11 may disfigure when a head of a user forcefully expands the temples 12 and the force is concentrated on the location where the lens 10 and the connector 11 is connected. And a third disadvantage is that the lens 10 and the connector 11 are combined with together in a parallel tight condition, not permitting the temple to expand outward and letting a user feel uncomfortable, with the galvanized surface of the both 11, 12 peeled off owing to frequent contact with each other.

Another known conventional eyeglasses shown in FIGS. 3 and 4, includes two lenses 13, a connector 14. The lens 13 has a connect hole 131 near an inner side edge, and two hole recesses 132 oppositely located at two sides of the connect hole 131, and the connector 14 is fitted in the connect hole 131. The connector 14 has a projection 141 on a right side to fit in the connect hole 131, a center hole 142 formed in the projection 141 and two recesses 142 formed oppositely at two sides of the projection 141, and the other end of the two recesses 142 formed into a projection to fit in the two recesses 132. And an arm 15 to be connected to a temple has a hole 152 in a left end 151, and two projections formed on an inner side of the left end and fitting in the two recesses 142 of the connector 14. Then a screw 16 passes through the hole 152, the center hole 141, and the washer 161 to engage with a nut tightly, constituting eyeglasses without a frame.

However, the second known conventional eyeglasses have the following disadvantages.

1. The lens is liable to brake at the location of the connect hole and the two recesses, with force concentrated on that location.

2. The connect hole and the two recesses of the lens and two recesses of the connector should be bored correctly, otherwise the lens, the connector and the temple are very difficult to connect with one another.

3. The temple is made of hard material, so the lens may be liable to brake, when the temple is forced to expand outward by the head of a user, with force concentrated on the connecting point of the lens and the temple.

SUMMARY OF THE INVENTION

The objective of the invention is to offer eyeglasses without a frame, comfortable to wear, easy and quick to assemble, and solid in its structure.

The main feature of the invention is a connector having a bent combine member and a vertical end rod member, and a ring formed in a front end of each temple, a fit member fitted in the ring and fitted around the vertical rod member to secure the temple with the connector. The fit member has four flat surfaces and a post extending down, and a center hole. The temple has a bent member formed in a front portion, which has proper elasticity to let the temple expand outward without damaged or disfigured,, forming an acute angle between the connector to prevent the temple from colliding with the connector.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
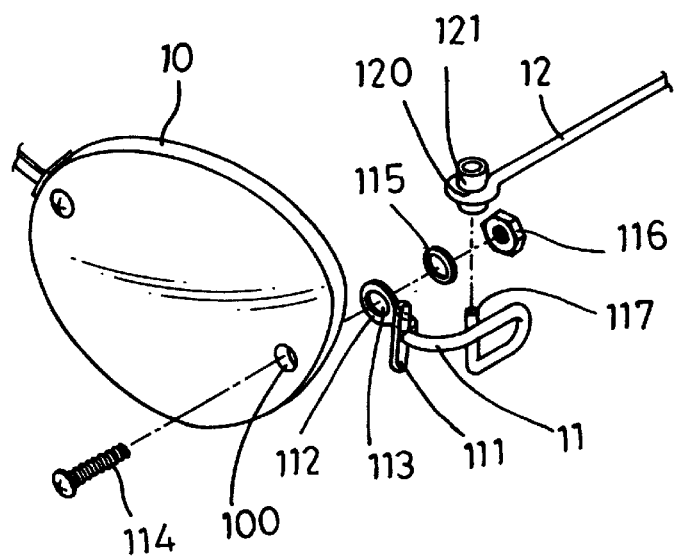
FIG. 1 is an exploded perspective view of a first known conventional eyeglasses without a frame.
Figure 2:
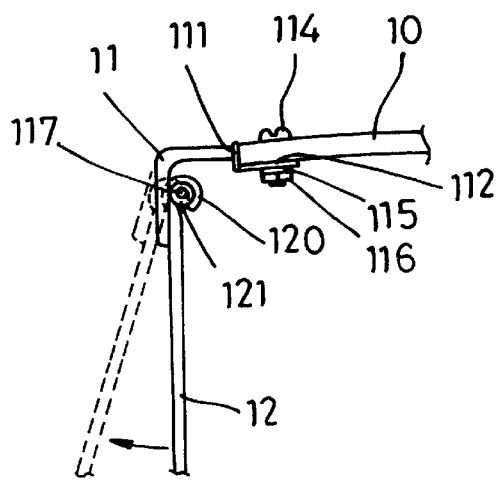
FIG. 2 is a side view of a temple of the first known conventional eyeglasses without a frame.
Figure 3:
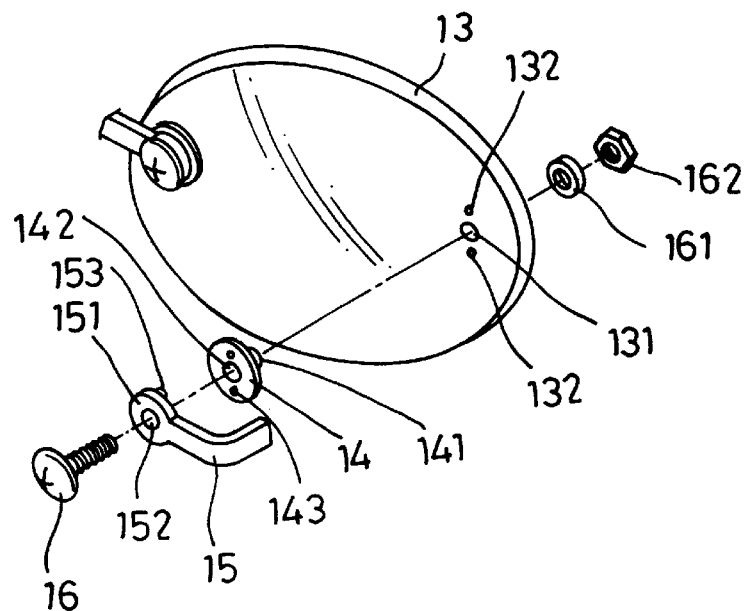
FIG. 3 is an exploded perspective view of a second known conventional eyeglasses without a frame.
Figure 4:
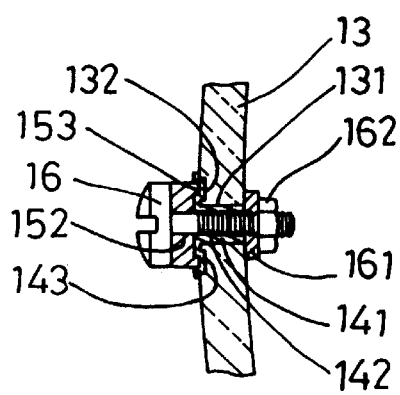
FIG. 4 is a side cross-sectional view of the second known conventional eyeglasses without a frame.
Figure 5:
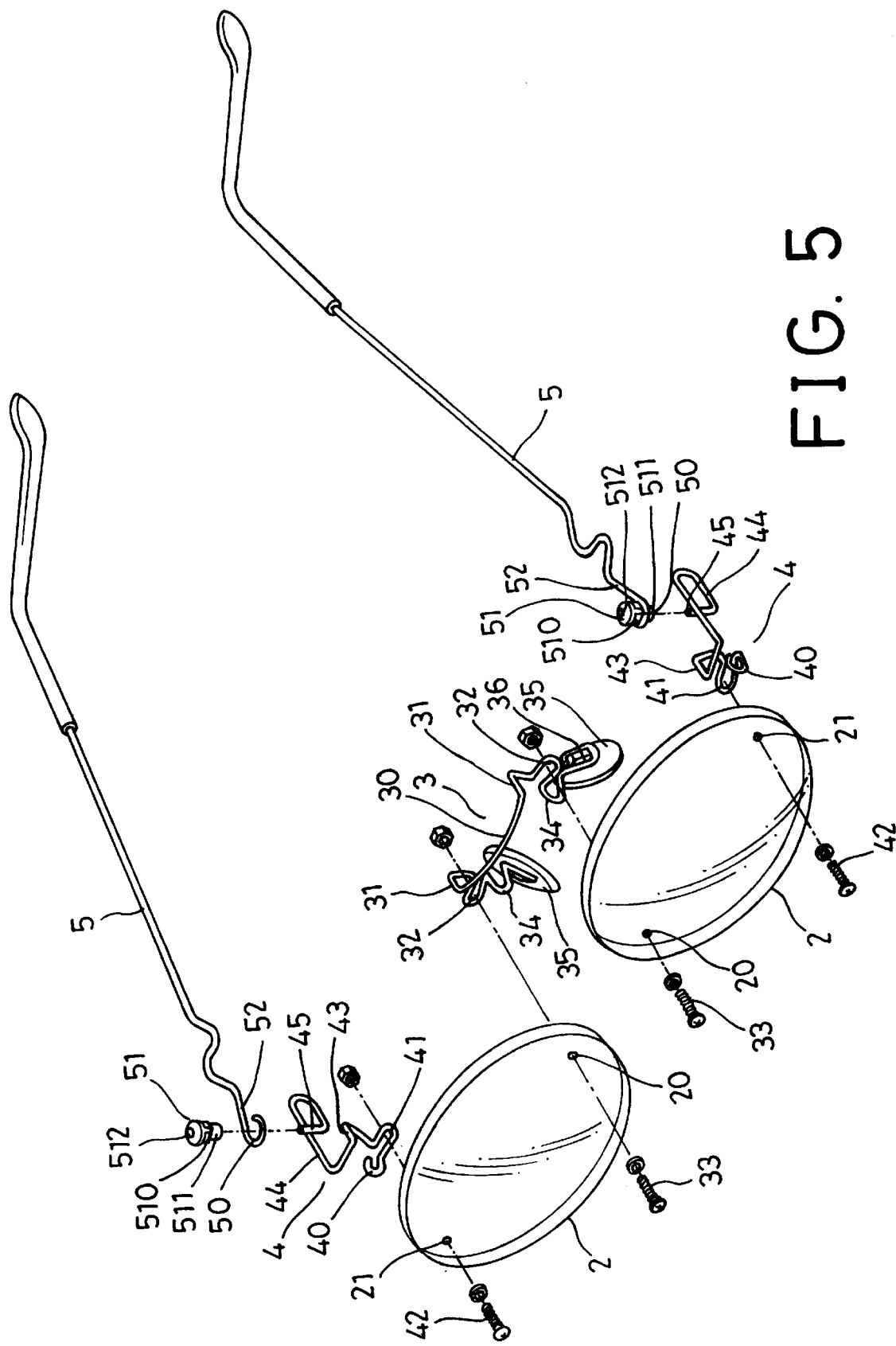
FIG. 5 is an exploded perspective view of eyeglasses without a frame in the present invention.
Figure 6:
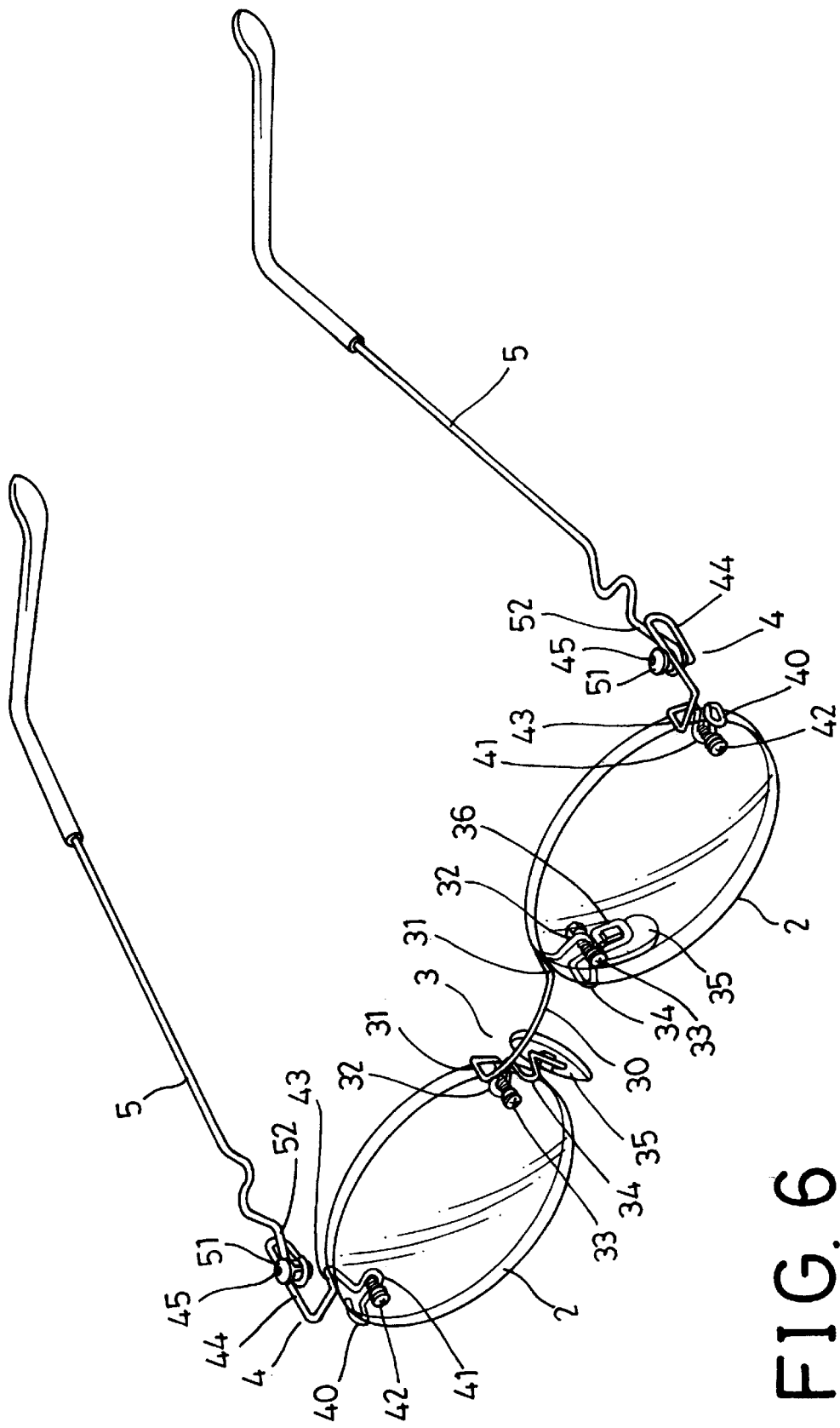
FIG. 6 is a perspective view of the eyeglasses without a frame in the present invention.
Figure 7:
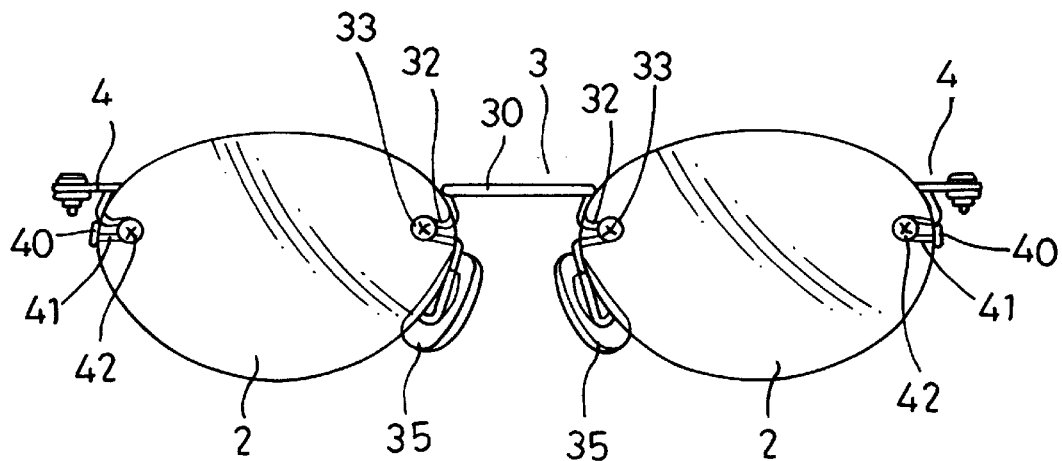
FIG. 7 is a front view of the eyeglasses without a frame in the present invention.
Figure 8:
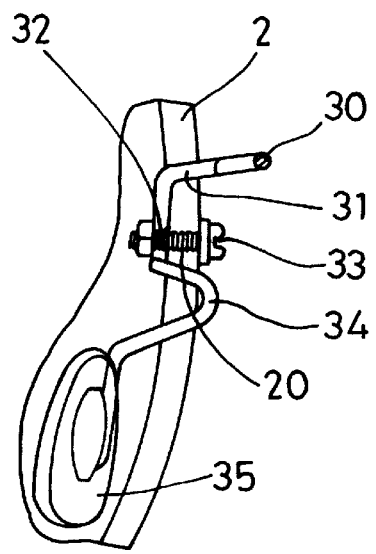
FIG. 8 is a side view of a bridge assembled with a lens in the eyeglasses without a frame in the present invention.
Figure 9:
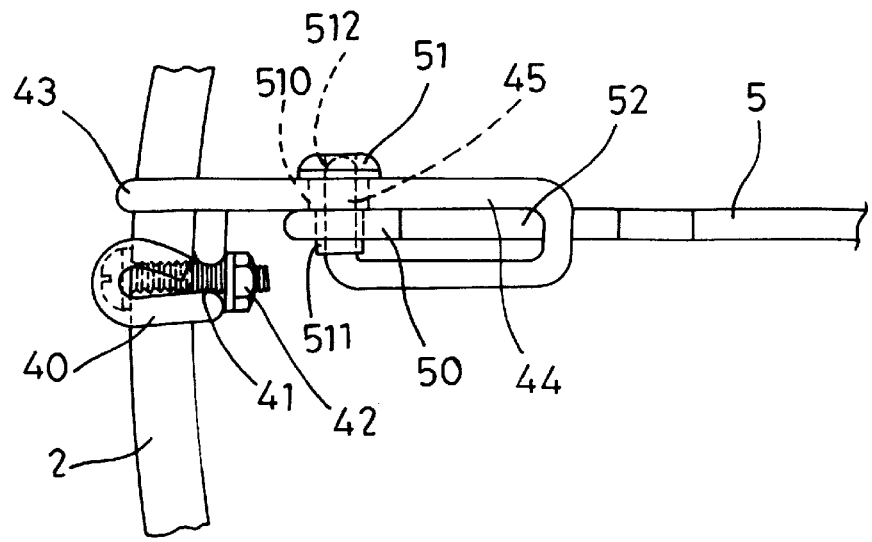
FIG. 9 is a side view of a connector in the eyeglasses in the present invention; and, FIG. 10 is a side view of a temple in the eyeglasses without a frame in the present invention, showing it being expanded.
Figure 10:
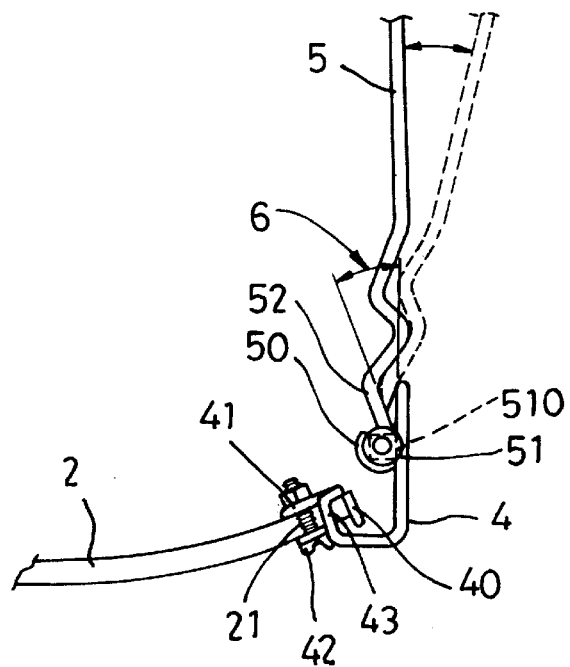

A preferred embodiment of eyeglasses without a frame in the present invention, as shown in FIG. 5, includes two lenses 2. a bridge 3, two connectors 4, two temples 5 as main components combined together.

Each lens 2 has two holes 20, 21 near an inner side edge and an outer side edge.

The bridge 3 is located between the two lenses 2, having a curved horizontal rod 30, a position member 31 respectively bending rearward from two sides and then bending downward, a U-shaped locking member 32 continuing from each position member 31 for a screw 33 to pass through, a lower rest member 34 continuing from the locking member 32, and a pad hole member 36 formed in a lower end for a nose pad 35 to be fixed on.

The two connectors 4 are respectively combined with the outer side of each lens 2, having a lower rest member 40, a U-shaped locking member 41 extending to wind up from the lower rest member 40 for a screw 42 to pass through, a position member 43 extending up windingly from the locking member 41, a combine member 44 extending rearward from the position member 43, and a vertical end rod member 45 formed from the combine member 44.

The two temples 5 are respectively connected to each connector 4, having a ring member 50 formed in a front end, a fit member 51 fixed in the ring member 50 and having four vertical flat surfaces 510 formed in a mutual right angle, a post member 511 formed to extend down. The fit member 51 has a center hole to fit around an upper end of the vertical rod portion 45 of each connector 4. The temple further has a curved portion 52 formed just behind the ring member 50 to produce proper elasticity to let the temple easily expand outward.

In assembling, referring to FIGS. 6, 7, 8 and 9, firstly the two locking members 32 of the bridge 3 are fitted in the holes 20 of the two lenses 2, with the position members 31 and the rest members 34 contacting the side edges of the lenses 2 to secure the bridge 3. The the screws 33 are put through the holes 20 and the locking members 32 of the bridge 3 and engage nuts to connect the bridge 3 between the two lenses 2. Next, the locking members 4 of the connectors 4 are put in the holes 21 of the two lenses 2, with the rest members 40 and the position members 43 contacting the side edge of the two lenses 2, and the connectors 4 are secured with the lenses 2, with the screws 42 put to pass through the holes 21 and locking members 41 and engaging a nut tightly. Then the rings 50 of the two temples 5 are placed to fit with the post 511 of the fit member 51 and welded together, making the fit member 51 and the ring 50 integral. After that, the fit member 51 are fitted on the vertical rod portion 45 of the connector 4, with one of the four flat surfaces 510 flatly contacts the combine member 4. Meanwhile, the curved portion 52 of the temple 5 forms an acute angle 6 with the connector 4, and the upper surface of the ring 50 is stopped by a horizontal rod of the combine member 44, securing the temple 5 stabilized with the connector 4, impossible to fall off the connecter 4. Thus, the eyeglasses are finished in assembling.

In using, as shown in FIGS. 6, 7, 8 and 9, when the two temples are worn on two ears of a user and expanded outward or shrunk inward, the fit member rotates with the vertical rod portion 45, with one of the four flat surfaces 510 fits with the connectors 4 in a stabilized condition. Then the angles 6 between the curved portions 52 and the connectors 4 have buffering spaces in case of expansion of the temples 5, not forcing the connectors 4 expand outward so that the connectors 4 may not disfigure or the lenses may not be broken. And the angle 6 is preferably 15 degrees, having the best buffering elasticity for comfortable wearing.

The eyeglasses without a frame in the invention has the following advantages, as can be understood from the above-mentioned description.

1. The whole structure is more stable than the conventional ones, with the position members and the rest members of the bridge and the connectors restraining the two lenses.

2. The lenses are not apt to brake, as force is reduced to concentrate on the edges near the holes because the position members and the rest members of the bridge and the connectors embrace the portions near the holes of the lenses.

3. The bridges and the connectors may properly absorb disfiguring impact caused by force to prevent the lenses from braking, as they are made of a flexible steel material.

4. The temples are prevented from disfiguring, being damaged by means of the curved portions having expandable elasticity when receiving striking force.

5. The plated surfaces of the temples and the connectors are prevented from peeling off, as there is a gap between the curved portions of the temples and the connectors impossible to collide or rub with each other.

While the preferred embodiment of the invention has been described above, it will be recognized and understood that various modifications may be made therein and the appended claims are intended to cover all such modifications which may fall within the spirit and scope of the invention.

What is claimed is:

1. Eyeglasses without a frame comprising two lenses, a bridge, two connectors and two temples, said lenses respectively having a hole each near two—an inner and an outer—side edge, said bridge located between said two lenses, said two connectors combined with an outer side of each said lens, said two temples respectively combined rearward with each said connector;

and characterized by said connectors respectively having a combine member bending upward in a rear portion, a vertical rod member formed in the rear end, said temples each having a ring member formed in a front end, a fit member fitted and welded in said ring, said fit member fitted on said vertical rod member for securing each said connector with each said temple, said fit member having four flat surfaces formed in a mutual right angle and a post extending downward and a center hole, said temples each having a bent member in a front portion behind said ring, said bent member forming an acute angle with each said combine member of each connector, one of said four flat surfaces flatly contacting said connector to secure each said temple, said bent member having proper elasticity to let each said temple expand outward, preventing said eyeglasses from disfiguring or damaged when receiving exterior force.

2. The eyeglasses without a frame as claimed in claim 1, wherein two sides of said bridge and said position members and said rest members of said connectors embrace said two lenses in a stabilized condition, and said bridge and said connectors all have said locking members for screws to pass through to engage with nuts for securing said bridge and said connectors with said two lenses more stabilized.

* * * * *